United States Patent [19]
Yamamoto

[11] Patent Number: 5,777,974
[45] Date of Patent: Jul. 7, 1998

[54] OPTICAL HEAD AND MAGNETO-OPTICAL REPRODUCING APPARATUS USING THE SAME

[75] Inventor: Masakuni Yamamoto, Yamato, Japan

[73] Assignee: Canon Kabushiki Kaisha, Tokyo, Japan

[21] Appl. No.: 594,326

[22] Filed: Jan. 30, 1996

Related U.S. Application Data

[63] Continuation of Ser. No. 352,227, Dec. 8, 1994, abandoned.

[30] Foreign Application Priority Data

Dec. 13, 1993 [JP] Japan ................................ 5-311513

[51] Int. Cl.$^6$ ........................................ G11B 7/00
[52] U.S. Cl. .................. 369/112; 369/100; 369/110; 369/44.32
[58] Field of Search ....................... 369/112, 110, 369/100, 118, 13, 106, 107, 44.32, 44.39, 44.41

[56] References Cited

U.S. PATENT DOCUMENTS

| | | | |
|---|---|---|---|
| 4,953,124 | 8/1990 | Koyama | 369/110 |
| 4,982,393 | 1/1991 | Matsushita et al. | 369/44.32 |
| 5,043,960 | 8/1991 | Nakao et al. | 369/13 |
| 5,105,399 | 4/1992 | Shimonou | 369/13 |
| 5,153,868 | 10/1992 | Fujinaga | 369/110 |
| 5,208,799 | 5/1993 | Nakao et al. | 369/110 |
| 5,218,582 | 6/1993 | Marchant | 369/112 |
| 5,247,510 | 9/1993 | Lee et al. | 369/118 |
| 5,293,569 | 3/1994 | Koyama | 369/112 |
| 5,329,517 | 7/1994 | Yamaguchi et al. | 369/110 |
| 5,365,504 | 11/1994 | Noguchi | 369/44.41 |
| 5,528,576 | 6/1996 | Nishikawa | 369/112 |

FOREIGN PATENT DOCUMENTS

| | | |
|---|---|---|
| 0218250 | 4/1987 | European Pat. Off. |
| 0346121 | 12/1989 | European Pat. Off. |

OTHER PUBLICATIONS

Patent Abstracts of Japan, Kokai No. 58–29151, vol. 7, No. 109, May 1983.

Patent Abstracts of Japan, Kokai No. 2–198044, vol. 14, No. 487, Oct. 1990.

Levenson, et al., "Edge Detection for Magnetooptical Data Storage," Applied Optics, vol. 30, No. 2, Jan. 1991, pp. 232 through 252.

Aratani, et al., "Magnetically Induced Super Resolution in Novel Magneto–Optical Disk," Optical Data Storage Topical Meeting, vol. 5, Feb. 1991, pp. 112 through 119.

*Primary Examiner*—Loha Ben
*Attorney, Agent, or Firm*—Fitzpatrick, Cella, Harper & Scinto

[57] ABSTRACT

In an optical head for radiating a light spot on a magneto-optical recording medium and detecting light received via the medium, there are provided a light source, a condenser lens for condensing light from the light source, a photodetector, and a deflecting device. The photodetector detects interference light between light generated by a magneto-optical effect of the medium and light generated by diffraction on a curved surface of the condenser lens. The deflecting device is arranged between the light source and the recording medium. The deflecting device includes a beam splitter with polarized light splitting characteristics and functions to deflect the light from the light source toward the recording medium.

24 Claims, 10 Drawing Sheets

OPTICAL HEAD AND MAGNETO-OPTICAL REPRODUCING APPARATUS USING THE SAME

This application is a continuation of prior application Ser. No. 08/352,227, filed Dec. 8, 1994, now abandoned.

BACKGROUND OF THE INVENTION

1. Field of the Invention

The present invention relates to an optical head for reproducing information recorded on a magneto-optical recording medium from the medium, and a magneto-optical reproducing apparatus having this optical head.

2. Related Background Art

FIG. 1 is a view schematically showing the arrangement of an optical head of a conventional magneto-optical recording/reproducing apparatus. Referring to FIG. 1, a divergent light beam emitted from a semiconductor laser 19 serving as a light source is collimated by a collimator lens 20 and shaped by a beam shaping prism 21 into a parallel light beam having a circular section. This light beam is incident on a polarizing beam splitter 22 as p-polarized light. The polarizing beam splitter 22 has characteristics representing, e.g., a p-polarized light transmittance of 60%, a p-polarized light reflectance of 40%, an s-polarized light transmittance of 0%, and an s-polarized light reflectance of 100%. The p-polarized light transmitted through the polarizing beam splitter 22 is focused by an objective lens 23 to form a light spot on the magnetic layer of a magneto-optical disk 24. A magnetic head 25 applies a magnetic field to the light beam spot position, thereby recording an information magnetic domain on the magnetic layer.

The light beam reflected from the magneto-optical disk 24 returns to the polarizing beam splitter 22 through the objective lens 23. At this time, a portion of the reflected light is split to reach a reproducing optical system 27. The light beam incident on the reproducing optical system 27 is split into two light beams by a polarizing beam splitter 26. The polarizing beam splitter 26 has characteristics representing, e.g., a p-polarized light transmittance of 20%, a p-polarized light reflectance of 80%, an s-polarized light transmittance of 0%, and an s-polarized light reflectance of 100%.

The light beam transmitted through the polarizing beam splitter 26 is guided to a beam splitter 36 through a condenser lens 35 and split into two light beams. One of the light beams is guided to a photodetector 37 for detecting a tracking error while the other is guided to a photodetector 39 for detecting a focusing error through a knife edge 38. With these control optical systems, error signals used for auto-tracking and auto-focusing of the light beam spot are generated. In the reproducing optical system 27, the light beam reflected by the polarizing beam splitter 26 passes through a halfwave plate 28 and its polarization direction is rotated through 45°. The light beam is then focused by a condenser lens 29 to reach a polarizing beam splitter 30. The polarizing beam splitter 30 has characteristics representing, e.g., a p-polarized light transmittance of 100%, a p-polarized light reflectance of 0%, an s-polarized light transmittance of 0%, and an s-polarized light reflectance of 100%. The two light beams split by the polarizing beam splitter 30 are respectively incident on photodetectors 31 and 32. Detection signals from these photodetectors are differentially amplified by a differential amplifier 33 to generate a reproduction signal 34.

When linearly polarized light is irradiated on a magneto-optical recording medium having information recorded by magnetization in a perpendicular direction, the polarization direction of the reflected light is rotated clockwise or counterclockwise in accordance with the direction of magnetization. Assume that the polarization direction of linearly polarized light incident on the magneto-optical recording medium is a P direction, as shown in FIG. 2. In this case, the polarization direction of the reflected light corresponding to downward magnetization is $R_+$ which is rotated through an angle $_+\theta_K$. The polarization direction of the reflected light corresponding to upward magnetization is $R_{31}$ which is rotated through an angle $-\theta_K$. If an analyzer is set in a direction as shown in FIG. 2, light transmitted through the analyzer is indicated as A in the case of $R_+$, and B in the case of $R_-$. By detecting these light components by using the photodetectors, information can be obtained as a difference in light intensity. In the example shown in FIG. 1, the polarizing beam splitter 30 serves as an analyzer. More specifically, the polarizing beam splitter 30 serves as an analyzer in a direction rotated +45° from the P direction for one of the split light beams, and an analyzer in a direction rotated −45° from the P direction for the other. Therefore, the signal components obtained by the photodetectors 31 and 32 have opposite phases, and a reproduction signal reduced in noise can be obtained by differentially amplifying and detecting these signals.

Recently, to increase memory capacity, there is a tendency in a recording scheme that a mark position recording method in which the interval between the central positions of information pits is significant is shifted to a mark length recording method in which the length of an information pit is significant. Information recorded by this mark length recording method is reproduced by electrically differentiating a pit signal optically detected by an optical head to detect the edge portion of the information pit. However, there is proposed a reproducing method in which a pit edge is directly optically detected (as discussed in copending U.S. patent application No. Ser. 012,453). This method will be described below with reference to FIG. 3 to FIGS. 6A–6F.

FIG. 3 is a view showing the arrangement of an optical head used for this reproducing method. The same reference numerals as in FIG. 1 denote members having the same functions in FIG. 3. An objective lens 23 has an NA of about 0.55 and a curved surface with a large curvature. When linearly polarized light from a semiconductor laser 19 is incident on this curved surface, the plane of polarization is slightly rotated in different directions at various positions on the curved surface. As a result, as for polarized light components in a direction perpendicular to the direction of the incident linearly polarized light, a four-leaf clover like diffraction image is obtained, as will be described later. The light beam from the semiconductor laser 19 is p-polarized light and irradiated on a magneto-optical disk 24 through the objective lens 23. The polarization direction of the p-polarized light beam at this time is set to be parallel or perpendicular to the tracks of the magneto-optical disk 24.

When the light beam incident on the magneto-optical disk 24 is reflected, s-polarized light components are generated by a magneto-optical effect (Kerr effect or Faraday effect). The reflected light beam passes through the objective lens 23 again to become a parallel light beam. This parallel light beam includes s-polarized light components generated by the curved surface of the objective lens 23 in addition to the s-polarized light components generated by the magneto-optical effect of the magneto-optical disk 24.

A portion of the reflected light beam from the magneto-optical disk 24 is reflected by a polarizing beam splitter 22 and guided to a polarizing beam splitter 40. The polarizing beam splitter 40 has characteristics representing, e.g., a p-polarized light transmittance of 100%, a p-polarized light reflectance of 0%, an s-polarized light transmittance of 0%, and an s-polarized light reflectance of 100%. With this arrangement, the p-polarized light beam is guided to a control optical system through the polarizing beam splitter 40, thereby generating error signals used for auto-focusing and auto-tracking. The s-polarized light beam is reflected by the polarizing beam splitter 40, guided to a condenser lens 41 of a reproducing optical system, and detected by the detection surfaces of a two-segment photodetector 42. A reproduction signal 44 is generated by differentially amplifying detection signals from these detection surfaces by using a differential amplifier 43. The division line of the two-segment photodetector 42 is set to be parallel to the tracks of the magneto-optical disk 24. The light beam incident on the two-segment photodetector 42 includes the s-polarized light beam generated by the magneto-optical effect and the s-polarized light beam generated by the curved surface of the objective lens 23.

The s-polarized light beam generated by the magneto-optical effect includes a reflected light beam $S_+$ corresponding to upward magnetization and a reflected light beam $S_{31}$ corresponding to downward magnetization, as is apparent from FIG. 2. The phase difference between these light beams is $\pi$. That is, if a boundary (edge portion) between upward magnetization and downward magnetization is present in the light spot, diffraction of light occurs as in the edge portion of a pit with a depth of $\lambda/4$. This will be described later.

The s-polarized light beam generated by the curved surface of the objective lens 23 can be described as follows. Referring to FIGS. 4A and 4B, the two-segment photodetector 42 has detection surfaces 42-1 and 42-2, and an arrow A represents the direction of optically corresponding information tracks. FIG. 4A shows the distribution of the light $S_+$ generated by the magnetooptical effect. FIG. 4B shows the distribution of the s-polarized diffraction light generated by the curved surface of the objective lens 23. In FIG. 4B, a four-leaf clover like distribution is obtained in which the opposing leaves have the same phase of light, and the phase difference between adjacent leaves is $\pi$. The distribution in FIG. 4B appears on the two-segment photodetector 42 independently of the direction of magnetization on the magneto-optical disk 24.

FIGS. 5A and 5B are views showing the amplitudes of light on sections taken along lines B-B' and C-C' in FIG. 4B, respectively. FIG. 5A shows the amplitude of light on the section B-B', and FIG. 5B shows the amplitude of light on the section C-C'.

The reproducing method will be described more specifically with reference to FIGS. 6A to 6F.

FIG. 6A is a view showing the relationship between the reproducing light beam spot and the magnetic domain, in which a magnetic domain 46 is recorded on an information track 45 by a magnetic field modulation method. As the recording method, an optical modulation method may also be used. The magneto-optical disk 24 is assumed to be magnetized downward on the entire surface in the initial state. Therefore, magnetization of the magnetic domain 46 directs upward. A light beam spot 47 scans the information track 45 having the magnetic domain 46 recorded thereon in an A direction as indicated by spots 48, 49, 50, and 51. FIG. 6B is a view showing the distributions of the s-polarized light at the positions of the light spots in FIG. 6A on the two-segment photodetector 42, which light is generated by the magneto-optical effect. The two-segment photodetector 42 has the detection surfaces 42-1 and 42-2. At the positions of the light beam spots 47 and 51, magnetization in these spots directs downward. Since no diffraction of light is caused, a circular distribution is obtained on the two-segment photodetector 42. At the positions of the light beam spots 48 and 50, the edge of the magnetic domain 46 is located in each spot. For this reason, upward magnetization and downward magnetization are simultaneously present in these spots. The light is diffracted in a direction parallel to the track 45, and the light distributions as shown in FIG. 6B are obtained on the two-segment photodetector 42. The phase difference between the right and left light distribution regions is $\pi$. However, the phase relationship between the right and left regions at the position of the light beam spot 48 is opposite to that at the position of the light beam spot 50. In addition, at the position of the light beam spot 49, almost the entire region in the spot is magnetized upward, so that substantially no diffraction of light is caused, and the light distribution as shown in FIG. 6B is obtained. The phase difference between the position of light beam spot 49 and the position of the light beam spot 47 or 51 is $\pi$.

FIG. 6C is a view showing the amplitude of light on a section taken along a line D-D' in FIG. 6B in correspondence with the position of each light beam spot. FIGS. 6D and 6E are views showing light intensity distributions obtained upon interference between the light distribution shown in FIG. 6B and that shown in FIG. 4B on the two-segment photodetector 42. FIG. 6D shows an intensity distribution along a line B-B', and FIG. 6E shows an intensity distribution along a line C-C'. In the distributions shown in FIGS. 6D and 6E, the distributions at the right and left positions of the light beam spots 47, 49, and 51 on the two-segment photodetector 42 are asymmetrical although the detection surfaces 42-1 and 42-2 receive the same amount of light. To the contrary, the distributions at the right and left positions of the light beam spots 48 and 50 on the two-segment photodetector 42, which correspond to the edge positions of the magnetic domain 46, are symmetrical. However, the amount of light received by the detection surface 42-1 is different from that received by the detection surface 42-2. When outputs from the detection surfaces 42-1 and 42-2 are differentially amplified by the differential amplifier 43, all reproduction signals obtained at the positions of the spots 47, 49, and 51, where the detection surfaces 42-1 and 42-2 receive the same amount of light, are 0, as shown in FIG. 6F. To the contrary, at the positions of the spots 48 and 50, where the detection surfaces 42-1 and 42-2 receive different amounts of light, reproduction signals having a peak in the positive or negative direction are obtained. Therefore, the edge of the magnetic domain 46 can be directly detected by detecting the position of the peak with a positive or negative value in the reproduction signal.

In this manner, the edge of the magnetic domain can be directly detected. At the same time, as shown in FIG. 3, particularly, the reproducing optical system of the optical head can be simplified to some extent as compared to the arrangement shown in FIG. 1.

To reduce the size of an optical head, a technique has been proposed in which an error signal used for auto-focusing or auto-tracking is detected by a photodetector arranged in a semiconductor laser, as shown in FIG. 7. Referring to FIG. 7, a light beam emitted from a semiconductor laser chip 53 passes through a cover 54 having a hologram and is guided to a recording medium. The light beam reflected by the recording medium returns to a semiconductor laser 52 along the same optical path. A portion of the returned light is deflected by the hologram of the cover 54 and guided to a multisegment photodetector 55. The hologram of the cover 54 is constituted by a plurality of regions with different grating frequencies. The light beam is guided from each region to a corresponding photodetection surface. With this arrangement, for example, a focusing error signal is obtained by the Foucault method, and a tracking error signal is obtained by the push-pull method.

However, for the optical head using the reproducing method in which the above-described four-leaf clover-like diffraction light beam is used, further size reduction is desired. Additionally, in the semiconductor laser having the above-described error signal detecting function, no magneto-optical information signal can be reproduced. Therefore, since the conventional reproducing optical system shown in FIG. 1 is used, sufficient size reduction of the reproducing system is not achieved yet.

SUMMARY OF THE INVENTION

It is an object of the present invention to provide a magneto-optical information reproducing optical head capable of decreasing the number of constituent components, thereby realizing reduction in size and weight.

In order to achieve the above object, according to the present invention, there is provided an optical head for irradiating a magneto-optical recording medium with a light spot and detecting light received via the medium, comprising a light source, condensing means, having a lens, for condensing light from the light source onto the medium, photodetecting means for detecting interference light between light generated by a magneto-optical effect of the medium and light generated by diffraction on a curved surface of the lens, and deflecting means, arranged between the light source and the medium, for deflecting the light from the light source toward the medium, the deflecting means having a beam splitter with polarized light splitting characteristics.

According to the present invention, there is also provided an optical head for irradiating a magneto-optical recording medium with a light spot and detecting light received via the medium, comprising a light source, condensing means for condensing light from the light source onto the medium, deflecting means, arranged between the light source and the medium, for deflecting the light from the light source toward the medium, the deflecting means having a beam splitter with polarized light splitting characteristics, and photodetecting means for detecting the light received via the medium, the photodetecting means having a two-segment photodetector for receiving, of light components received via the medium, light components transmitted through the beam splitter, the two-segment photodetector having a division line whose direction optically matches a direction of an information track on the recording medium at a position of light irradiation.

DESCRIPTION OF THE PREFERRED EMBODIMENTS

An embodiment of the present invention will be described below in detail with reference to the accompanying drawings.

Figure 8:
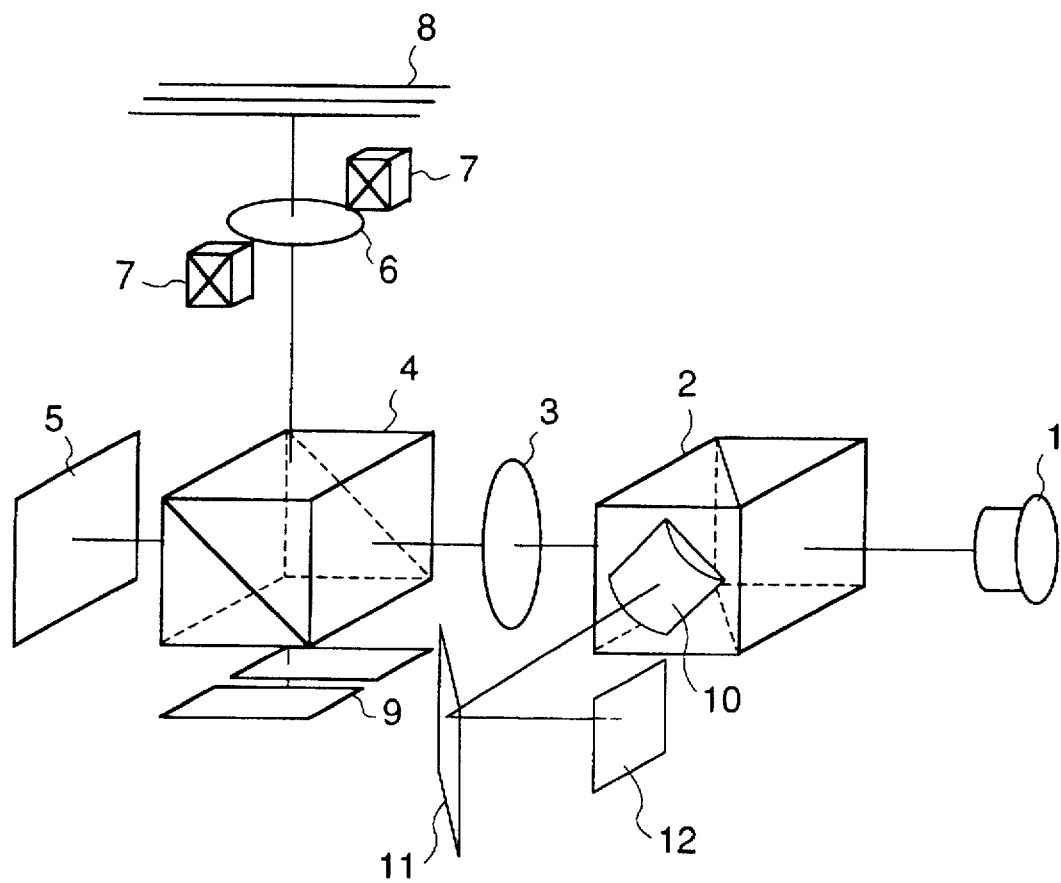
FIG. 8 is a view schematically showing the arrangement of the first embodiment of an optical head according to the present invention.

FIG. 8 is a view schematically showing the arrangement of the first embodiment of an optical head according to the present invention.

Referring to FIG. 8, a light beam emitted from a semiconductor laser 1 serving as a light source is incident on a beam splitter 2. The beam splitter 2 has characteristics representing a transmittance of 80% and a reflectance of 20%. The light beam transmitted through the beam splitter 2 is collimated into a parallel light beam through a collimator lens 3 and guided to a polarizing beam splitter 4. The light beam incident on the polarizing beam splitter 4 is a linearly polarized light beam having a plane of polarization slightly inclined with respect to the plane of polarization of s-polarized light. The polarizing beam splitter 4 has characteristics representing a p-polarized light transmittance of 100%, a p-polarized light reflectance of 0%, an s-polarized light transmittance of 0%, and an s-polarized light reflectance of 100%. Since the parallel light beam incident on the polarizing beam splitter 4 is linearly polarized light having a plane of polarization slightly rotated from the s-polarized light, the p-polarized light components as a portion of the parallel light beam pass through the polarizing beam splitter 4 and are detected by a photodetector 5. This detection signal is used to monitor an output from the semiconductor laser 1. Remaining s-polarized light components accounting for most of the parallel light beam are reflected by the polarizing beam splitter 4 and deflected toward a magneto-optical disk 8 through almost 90°. The deflected light beam is irradiated on the information track of the magneto-optical disk 8 as a fine light spot by an objective lens 6. An objective lens drive coil 7 is used for auto-focusing and auto-tracking.

The reflected light beam from the magneto-optical disk 8 is collimated into an almost parallel light beam again through the objective lens 6 and returns to the polarizing beam splitter 4. As described above with reference to FIGS. 3 to 6F, this reflected light contains p-polarized light generated by the magneto-optical effect of the magneto-optical disk 8 and p-polarized diffraction light generated by the curved surface of the objective lens 6. The p-polarized light components pass through the polarizing beam splitter 4 and are detected by a two-segment photodetector 9. The direction of the division line of the two-segment photodetector 9 optically corresponds to the direction of the information track of the magneto-optical disk 8 at the position of light irradiation. Magneto-optical information is reproduced by the two-segment photodetector 9 using the same method as described above with reference to FIGS. 3 to 6F.

The s-polarized light components of the reflected light from the magneto-optical disk 8 are reflected by the polarizing beam splitter 4 and return to the beam splitter 2 through the collimator lens 3. The light beam reflected by the beam splitter 2 is detected by a multisegment photodetector 12 through a cylindrical lens 10 and a mirror 11 to output an error signal. In this case, a focusing error signal is obtained using the astigmatism method, and a tracking error signal is obtained using the push-pull method. However, another method may also be used, as a matter of course. The characteristic (reflectance) of the beam splitter 2 can be set in accordance with the amount of light necessary for detection of an error signal for auto-focusing or auto-tracking.

As described above, in this embodiment, the polarizing beam splitter 4 is used in the optical head using the reproducing method in which the four-leaf clover-like diffraction light obtained by the objective lens is used. With this arrangement, the reproducing system is further simplified as compared to the optical head shown in FIG. 3.

Figure 9:
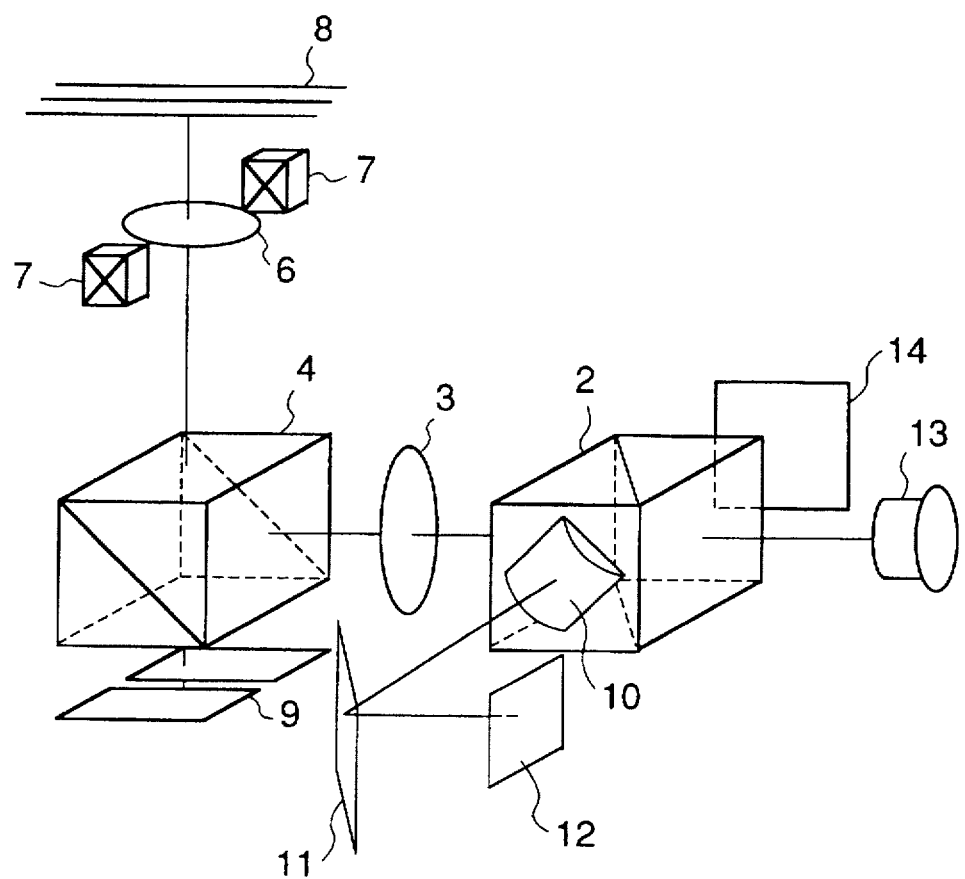
FIG. 9 is a view schematically showing the arrangement of the second embodiment of the optical head according to the present invention.

FIG. 9 is a view schematically showing the arrangement of the second embodiment of the optical head according to the present invention. The same reference numerals as in FIG. 8 denote members having the same functions in FIG. 9.

In this embodiment, a portion of light emitted from a semiconductor laser 13 is reflected by a beam splitter 2 and detected by a photodetector 14. An output from the semiconductor laser 13 is monitored by the photodetector 14. In this case, the light beam emitted from the semiconductor laser 13 may be s-polarized light with respect to the splitting surface of a polarizing beam splitter 4. Therefore, a loss in the amount of light at the polarizing beam splitter 4 is almost eliminated.

Figure 10:
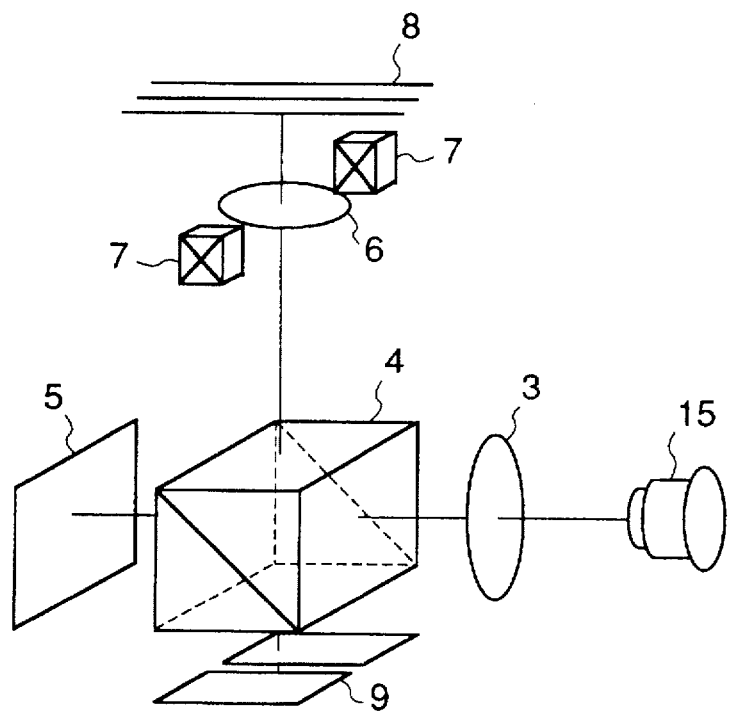
FIG. 10 is a view schematically showing the arrangement of the third embodiment of the optical head according to the present invention.

FIG. 10 is a view schematically showing the arrangement of the third embodiment of the optical head according to the present invention. The same reference numerals as in FIGS. 8 and 9 denote members having the same functions in FIG. 10.

Figure 1:
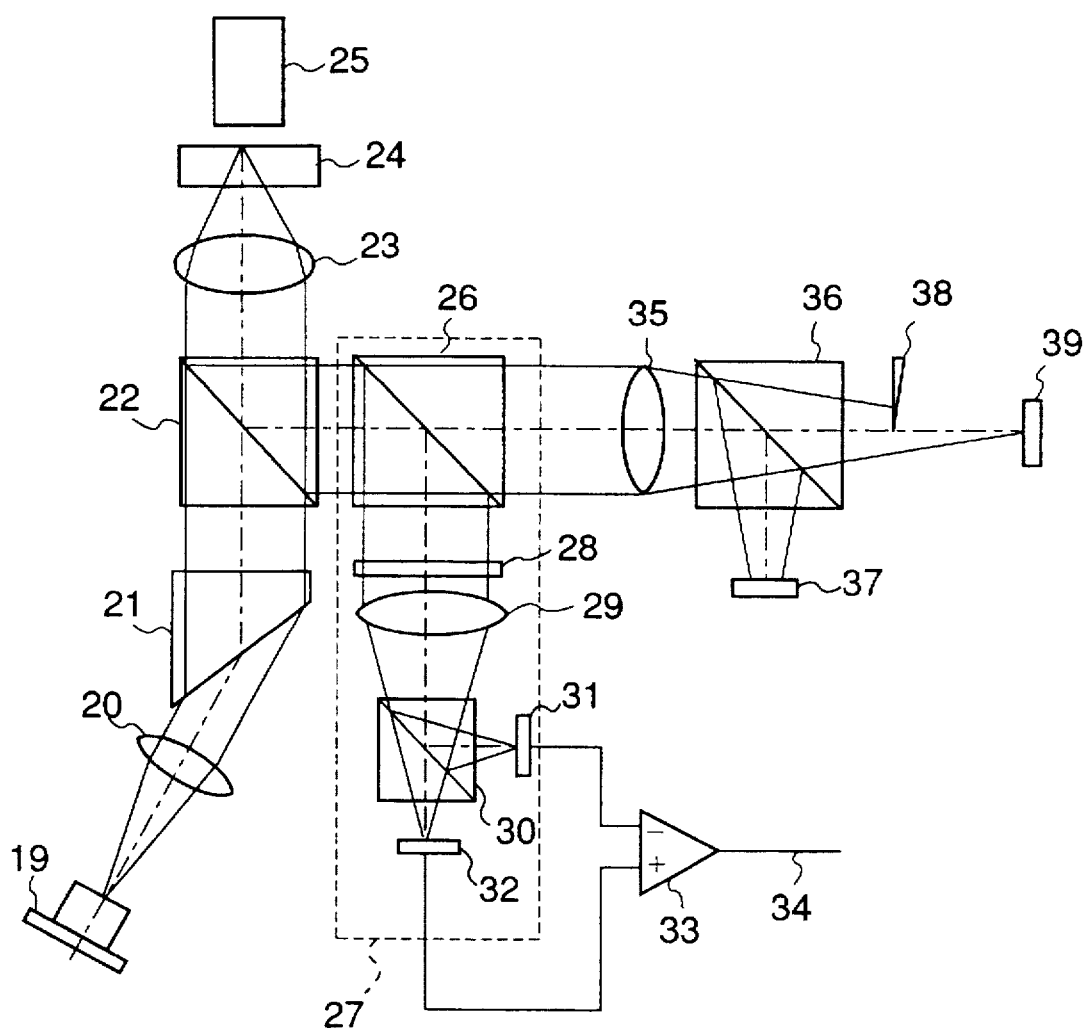
FIG. 1 is a view schematically showing the arrangement of an optical head of a conventional magneto-optical recording/reproducing apparatus.
Figure 2:
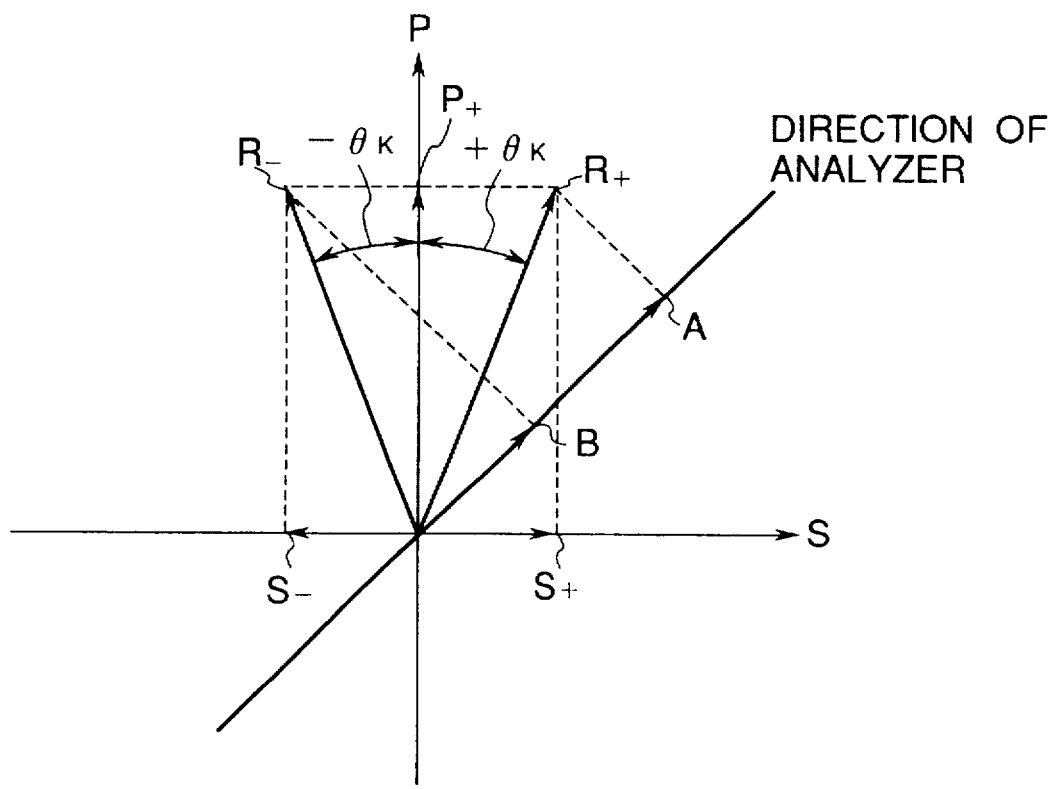
FIG. 2 is a view for explaining magneto-optical signal detection.
Figure 3:
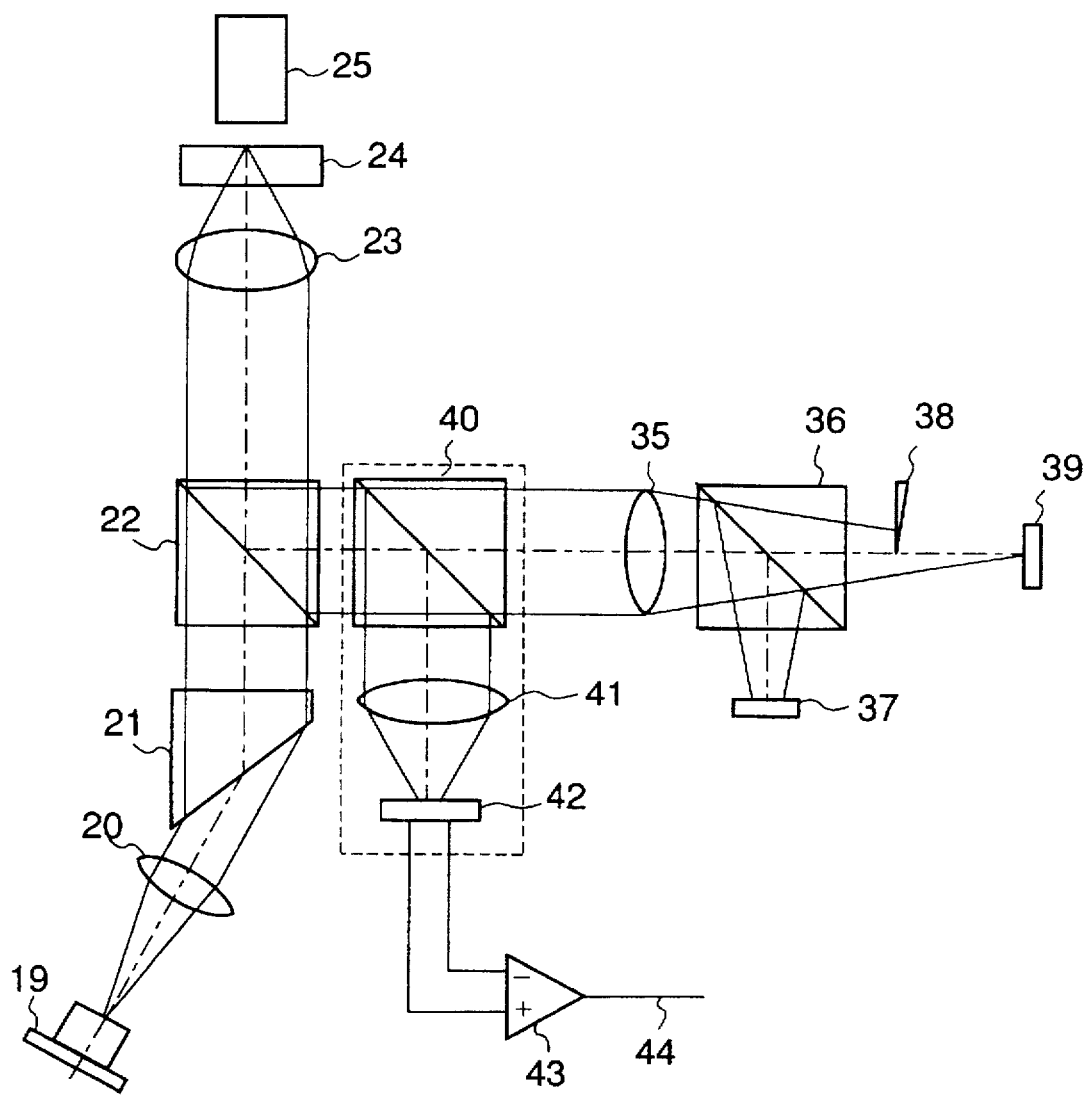
FIG. 3 is a view showing the arrangement of the optical head used for a reproducing method in which light diffracted on the curved surface of an objective lens is used to obtain a reproduction signal.
Figure 4A:
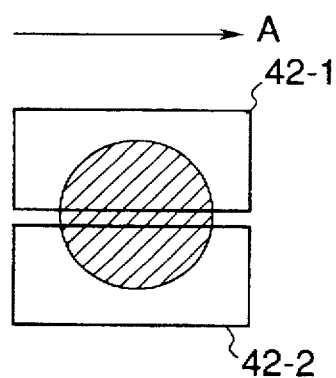
FIGS. 4A and 4B are views showing light distributions on a photodetector.
Figure 4B:
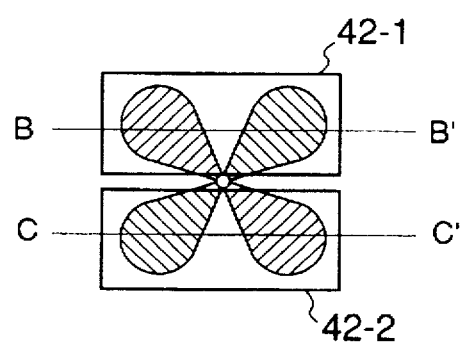
Figure 5A:
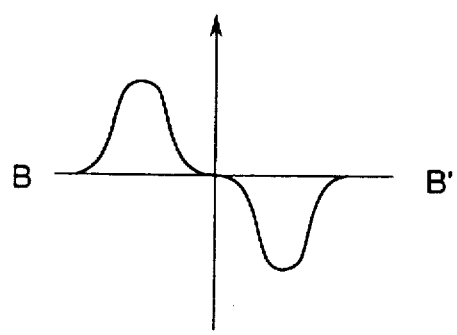
FIGS. 5A and 5B are views showing the amplitudes of light along lines B–B' and C–C' in FIG. 4B.
Figure 5B:
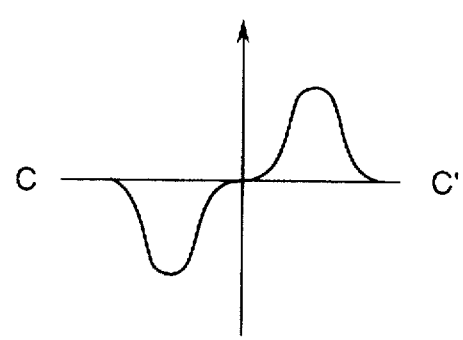
Figure 6A:
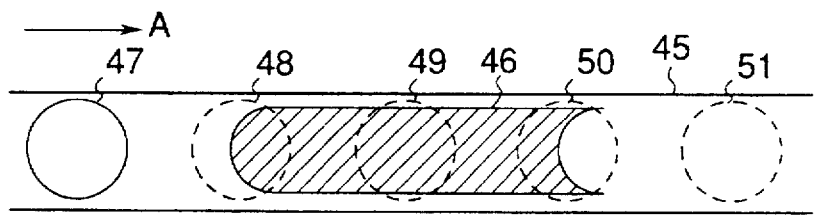
FIGS. 6A to 6F are views for explaining the information reproducing method by the optical head in FIG. 3.
Figure 6B:
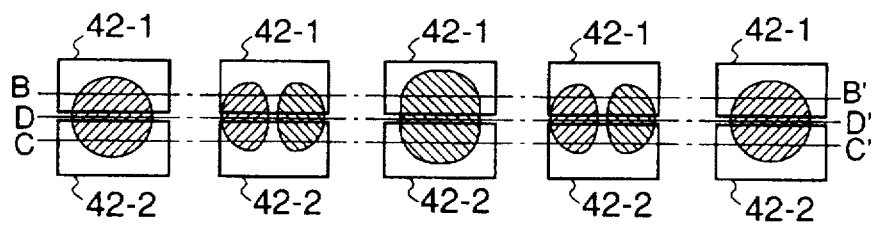
Figure 6C:
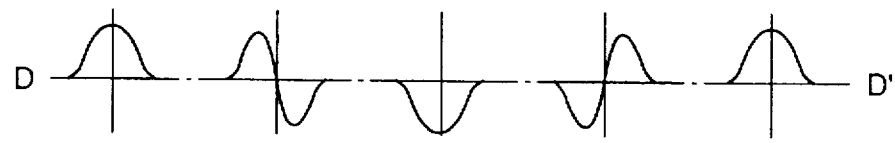
Figure 6D:
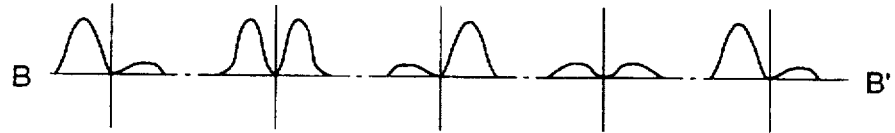
Figure 6E:
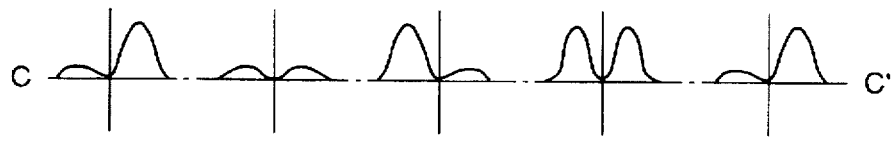
Figure 6F:
Figure 7:
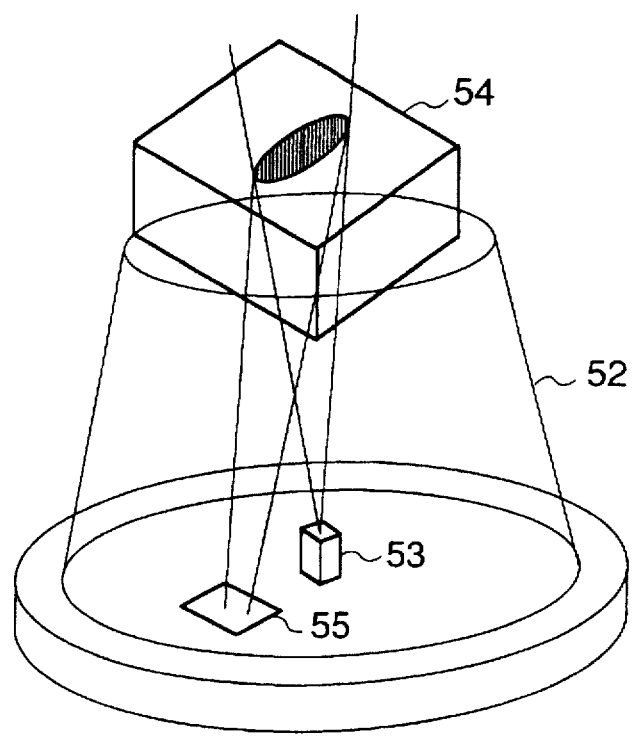
FIG. 7 is a view schematically showing the arrangement of a semiconductor laser having an error signal detecting function.

In this embodiment, the semiconductor laser having the error signal detecting function, which is described with reference to FIG. 7, is used as a semiconductor laser 15. A light beam emitted from the semiconductor laser 15 is linearly polarized light having a plane of polarization slightly rotated from the plane of polarization of s-polarized light, as in the embodiment in FIG. 8. An error signal for auto-focusing or auto-tracking is detected by a detecting system in the semiconductor laser 15. For this reason, the beam splitter 2, the cylindrical lens 10, the mirror 11, and the photodetector 12, which are used in the embodiment in FIG. 8, become unnecessary, thereby achieving further size reduction.

Figure 11:
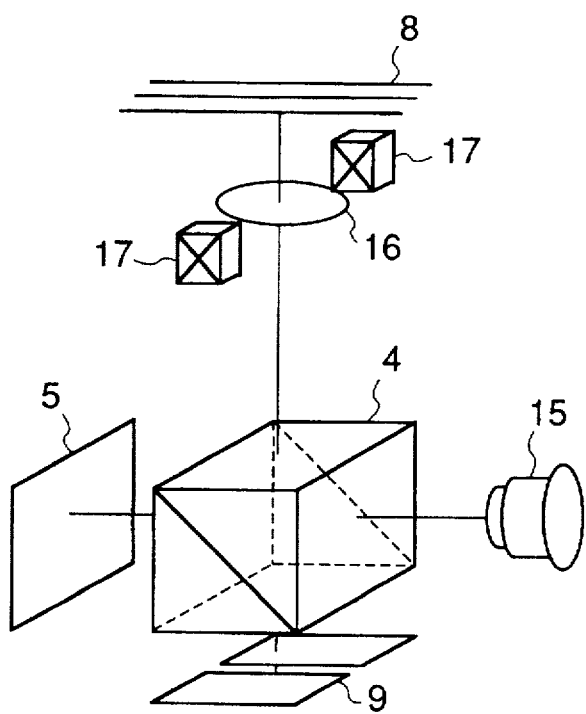
FIG. 11 is a view schematically showing the arrangement of the fourth embodiment of the optical head according to the present invention.

FIG. 11 is a view schematically showing the fourth embodiment of the optical head according to the present invention. The same reference numerals as in FIGS. 8 to 10 denote members having the same functions in FIG. 11.

In this embodiment, an optical head of a finite system without any collimator lens is provided. An objective lens 16 is integrally controlled with other optical elements by a drive coil 17. Of course, only the objective lens may be driven.

In the second to fourth embodiments, the same effect as in the first embodiment can be obtained, as a matter of course.

An embodiment in which the p- and s-polarized light components in the above embodiments are respectively replaced with s- and p-polarized light components is also involved in the present invention.

As has been described above, according to the optical head of the present invention, the number of constituent components can be decreased, thereby realizing further reduction in size and weight of the optical head.

Figure 12:
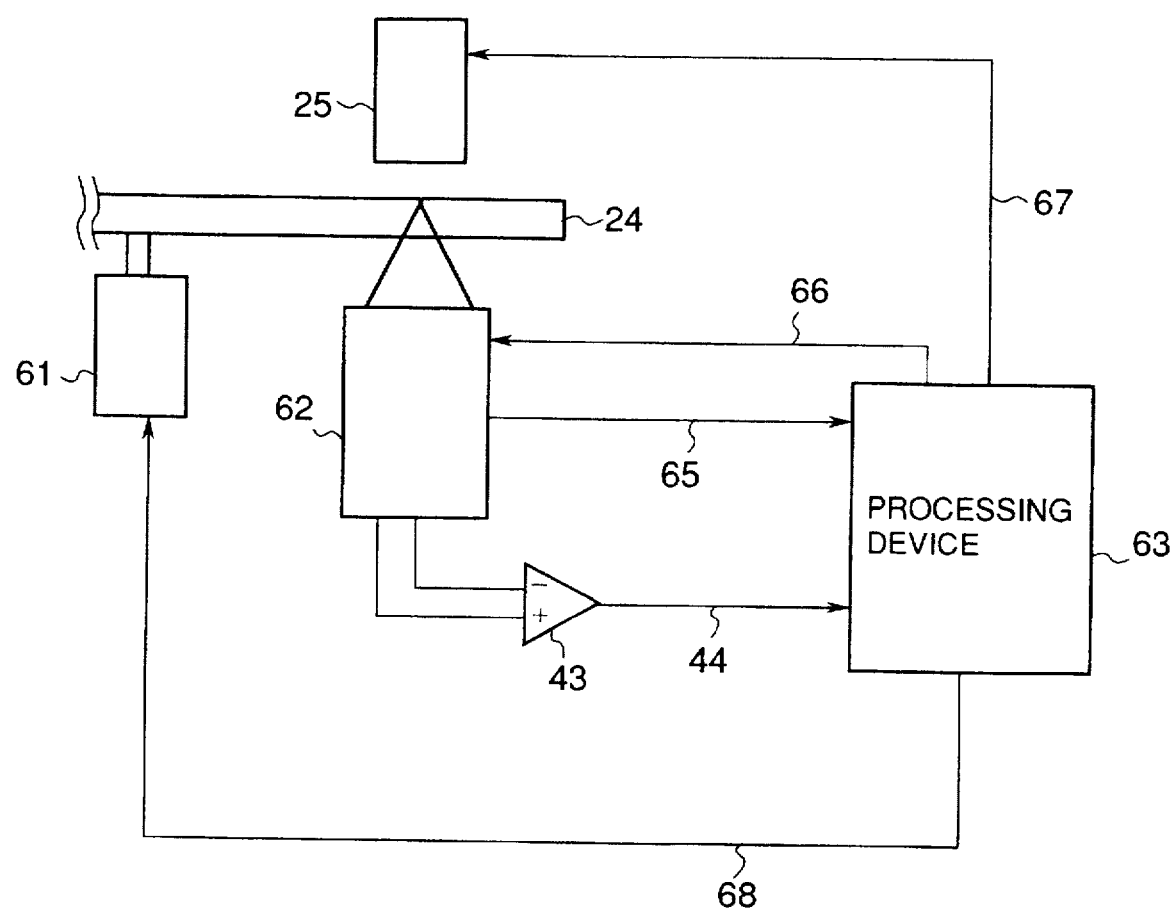
FIG. 12 is a view schematically showing the arrangement of an embodiment of a magneto-optical reproducing apparatus of the present invention.

A magneto-optical reproducing apparatus using the optical head of the present invention will be described below with reference to FIG. 12.

A spindle motor 61 rotates a magneto-optical disk 24. The motor 61 and a magnetic head 25 are driven in accordance with a signal from a processing device 63. As an optical head 62, one of the optical heads described in FIGS. 8 to 11 is used. A signal 65 from a detector 5, 14, or 12 in the optical head is used as a light source output monitor signal or a tracking or focusing error signal. An amplifier 43 differentially amplifies a signal from a segment photodetector 9. A signal 44 or 65 is sent to the processing device 63 to control the optical head 62, the motor 61, the magnetic head 25, and the like through a controller (not shown).

The present invention is not limited to the above embodiments and includes various arrangements without departing from the spirit and scope of the invention.

In the above embodiments, a reflection-type magneto-optical disk is used as a recording medium. However, a card-like or light-transmission-type recording medium can also be used. In addition, the polarizing beam splitter 4 is not limited to one for deflecting light through 90°. A Rochon prism or a hologram may also be applied as far as it has polarized light splitting characteristics.

What is claimed is:

1. An optical head for radiating a light spot on a magneto-optical recording medium and detecting light received via said medium, comprising:

a light source;

condensing means, having a lens, for condensing light from said light source onto said medium;

photodetecting means for detecting interference light between light generated by a magneto-optical effect of said medium and light generated by diffraction on a curved surface of the lens; and deflecting means, arranged between said light source and said medium, for deflecting the light from said light source toward said medium, said deflecting means having a beam splitter with polarized light splitting characteristics.

2. A head according to claim 1, wherein an angle of deflection upon deflecting the light toward said medium by the beam splitter is substantially 90 degrees.

3. A head according to claim 1, wherein said photodetecting means has a two-segment photodetector for receiving, of light components received via said medium, light components transmitted through the beam splitter.

4. A head according to claim 3, wherein a direction of a division line of the two-segment photodetector optically corresponds to a direction of an information track on said recording medium at a position of light irradiation.

5. A head according to claim 1, wherein the beam splitter has a p-polarized light transmittance of substantially 100% and an s-polarized light reflectance of substantially 100% with respect to a polarized light splitting surface.

6. A head according to claim 1, wherein a portion of the light travelling from said light source toward the beam splitter has p-polarized light components with respect to a polarized light splitting surface of the beam splitter, and said optical head has a monitoring photodetector for detecting the light transmitted through the beam splitter to monitor an output from said light source.

7. An optical head for radiating a light spot on a magneto-optical recording medium and detecting light received via said medium, comprising:
 a light source;
 condensing means for condensing light from said light source onto said medium;
 deflecting means, arranged between said light source and said medium, for deflecting the light from said light source toward said medium, said deflecting means having a beam splitter with polarized light splitting characteristics; and
 photodetecting means for detecting the light received via said medium, said photodetecting means having a two-segment photodetector for receiving, of light components received via said medium, light components transmitted through the beam splitter, the two-segment photodetector having a division line whose direction optically matches a direction of an information track on said recording medium at a position of light irradiation.

8. A head according to claim 7, wherein an angle of deflection upon deflecting the light toward said medium by the beam splitter is substantially 90 degrees.

9. A head according to claim 7, wherein the beam splitter has a p-polarized light transmittance of substantially 100% and an s-polarized light reflectance of substantially 100% with respect to a polarized light splitting surface.

10. A head according to claim 7, wherein a portion of the light travelling from said light source toward the beam splitter has p-polarized light components with respect to a polarized light splitting surface of the beam splitter, and said optical head has a monitoring photodetector for detecting the light transmitted through the beam splitter to monitor an output from said light source.

11. A magneto-optical reproducing apparatus in which a light spot is radiated on a magneto-optical recording medium and light received via said medium is detected to thereby reproduce information, comprising:
 driving means for moving said medium;
 a light source;
 condensing means, having a lens, for condensing light from said light source onto said medium;
 a magnetic head for applying a magnetic field to said medium at a position where the light from said light source is radiated;
 photodetecting means for detecting interference light between light generated by a magneto-optical effect of said medium and light generated by diffraction on a curved surface of the lens;
 reproducing means for reproducing information from an output from said photodetecting means; and
 deflecting means, arranged between said light source and said medium, for deflecting the light from said light source toward said medium, said deflecting means having a beam splitter with polarized light splitting characteristics.

12. An apparatus according to claim 11, wherein said photodetecting means has a two-segment photodetector for receiving, of light components received via said medium, light components transmitted through the beam splitter, the two-segment photodetector having a division line whose direction optically matches a direction of an information track on said recording medium at the position of light irradiation.

13. A magneto-optical reproducing apparatus in which a light spot is radiated on a magneto-optical recording medium and light received via said medium is detected to thereby reproduce information, comprising:
 driving means for moving said medium;
 a light source;
 condensing means for condensing light from said light source onto said medium;
 a magnetic head for applying a magnetic field to said medium at a position where the light from said light source is radiated;
 deflecting means, arranged between said light source and said medium, for deflecting the light from said light source toward said medium, said deflecting means having a beam splitter with polarized light splitting characteristics;
 photodetecting means for detecting the light received via said medium, said photodetecting means having a two-segment photodetector for receiving, of light components received via said medium, light components transmitted through the beam splitter, the two-segment photodetector having a division line whose direction optically matches a direction of an information track on said recording medium at a position of light irradiation; and
 reproducing means for reproducing information from an output from said photodetecting means.

14. An optical head for radiating a light spot onto a magneto-optical recording medium and detecting light received via said medium, said optical head comprising:
 a light source;
 condensing means, having a lens, for condensing light from said light source onto said medium;
 photodetecting means for detecting light which has been reflected by said medium and has passed said lens; and
 deflecting means, arranged between said light source and said medium, for deflecting the light from said light source toward said medium, said deflecting means comprising a beam splitter with polarized light splitting characteristics,
 wherein said photodetecting means comprises a two-segment photodetector for receiving, of light components received via said medium, light components transmitted through said beam splitter.

15. A head according to claim 14, wherein an angle of deflection upon deflecting the light toward said medium by the beam splitter is substantially 90 degrees.

16. A head according to claim 14, wherein a direction of a division line of the two-segment photodetector optically corresponds to a direction of an information track on said recording medium at a position of light irradiation.

17. An optical head for radiating a light spot onto a magneto-optical recording medium and detecting light received via said medium, said optical head comprising:

a light source;

condensing means, having a lens, for condensing light from said light source onto said medium;

photodetecting means for detecting light which has been reflected by said medium and has passed said lens; and deflecting means, arranged between said light source and said medium, for deflecting the light from said light source toward said medium, said deflecting means comprising a beam splitter with polarized light splitting characteristics, wherein the beam splitter has a p-polarized light transmittance of substantially 100% and an s-polarized light reflectance of substantially 100% with respect to a polarized light splitting surface.

18. An optical head for radiating a light spot onto a magneto-optical recording medium and detecting light received via said medium, said optical head comprising:

a light source;

condensing means, having a lens, for condensing light from said light source onto said medium;

photodetecting means for detecting light which has been reflected by said medium and has passed said lens; and deflecting means, arranged between said light source and said medium, for deflecting the light from said light source toward said medium, said deflecting means comprising a beam splitter with polarized light splitting characteristics, wherein a portion of the light travelling from said light source toward the beam splitter has p-polarized light components with respect to a polarized light splitting surface of the beam splitter, and said optical head includes a monitoring photodetector for detecting the light transmitted through the beam splitter to monitor an output from said light source.

19. An optical head for radiating a light spot onto a magneto-optical recording medium and detecting light received via said medium, said optical head comprising:

a light source;

condensing means for condensing light from said light source onto said medium;

deflecting means, arranged between said light source and said condensing means, for deflecting the light from said light source toward said medium, said deflecting means comprising a beam splitter with polarized light splitting characteristics; and photodetecting means for detecting the light received via said medium, said photodetecting means comprising a two-segment photodetector for receiving, of light components received via said medium, light components transmitted through the beam splitter, the two-segment photodetector having a division line whose direction optically matches a direction of an information track on said recording medium at a position of light irradiation.

20. A head according to claim 19, wherein an angle of deflection upon deflecting the light toward said medium by the beam splitter is substantially 90 degrees.

21. A head according to claim 19, wherein the beam splitter has a p-polarized light transmittance of substantially 100% and an s-polarized light reflectance of substantially 100% with respect to a polarized light splitting surface.

22. A head according to claim 19, wherein a portion of the light travelling from said light source toward the beam splitter has p-polarized light components with respect to a polarized light splitting surface of the beam splitter, and said optical head comprises a monitoring photodetector for detecting the light transmitted through the beam splitter to monitor an output from said light source.

23. A magneto-optical reproducing apparatus in which a light spot is radiated onto a magneto-optical recording medium and light received via said medium is detected to thereby reproduce information, said apparatus comprising:

driving means for moving said medium;

a light source for emitting a light beam;

condensing means, having a lens, for condensing the light beam from said light source onto said medium;

a magnetic head for applying a magnetic field to said medium at a position where the light beam from said light source is radiated;

photodetecting means for detecting light which has been reflected by said medium and has passed said lens;

reproducing means for reproducing information from an output from said photodetecting means; and deflecting means, arranged between said light source and said medium, for deflecting the light beam from said light source toward said medium, said deflecting means comprising a beam splitter with polarized light splitting characteristics, wherein said photodetecting means comprises a two-segment photodetector for receiving, of light components received via said medium, light components transmitted through said beam splitter, the two-segment photodetector having a division line whose direction optically matches a direction of an information track on said recording medium at the position of light irradiation.

24. A magneto-optical reproducing apparatus in which a light spot is radiated onto a magneto-optical recording medium and light received via said medium is detected to thereby reproduce information, said apparatus comprising:

driving means for moving said medium;

a light source for emitting a light beam;

condensing means for condensing the light beam from said light source onto said medium;

a magnetic head for applying a magnetic field to said medium at a position where the light beam from said light source is radiated;

deflecting means, arranged between said light source and said condensing means, for deflecting the light beam from said light source toward said medium, said deflecting means comprising a beam splitter with polarized light splitting characteristics;

photodetecting means for detecting the light received via said medium, said photodetecting means comprising a two-segment photodetector for receiving, of light components received via said medium, light components transmitted through said beam splitter, the two-segment photodetector having a division line whose direction optically matches a direction of an information track on said recording medium at a position of light irradiation; and reproducing means for reproducing information from an output from said photodetecting means.

* * * * *

UNITED STATES PATENT AND TRADEMARK OFFICE
CERTIFICATE OF CORRECTION

PATENT NO. : 5,777,974

DATED : July 7, 1998

INVENTOR : MASAKUNI YAMAMOTO

It is certified that error appears in the above-identified patent and that said Letters Patent is hereby corrected as shown below:

On the title page,

At item [56], under "U.S. PATENT DOCUMENTS", insert
--5,577,017  11/1996  Yamamoto, et al. ..... 369/110--; and At item [56], under "FOREIGN PATENT DOCUMENTS", insert
--0555049  8/1993  European Pat. Off.--.

IN THE DISCLOSURE

COLUMN 1:

line 52, "In the reproducing" should read
--¶     In the reproducing--.

COLUMN 2:

line 9, "$R_{31}$" should read --$R_{.}$--.

UNITED STATES PATENT AND TRADEMARK OFFICE
CERTIFICATE OF CORRECTION

PATENT NO. : 5,777,974

DATED : July 7, 1998

INVENTOR : MASAKUNI YAMAMOTO

Page 2 of 2

It is certified that error appears in the above-identified patent and that said Letters Patent is hereby corrected as shown below:

COLUMN 3:

line 23, "$S_{31}$" should read --$S_.$--; and
    line 39, "clover like" should read --clover-like--.

COLUMN 5:

line 28, "ing" should read --ing:--; and
    line 45, "comprising" should read --comprising:--.

Signed and Sealed this

Twenty-third Day of February, 1999

Attest:

Q. TODD DICKINSON

*Attesting Officer*    *Acting Commissioner of Patents and Trademarks*